United States Patent [19]

Kanai

[11] Patent Number: 5,057,922
[45] Date of Patent: Oct. 15, 1991

[54] BLACK LEVEL CLAMPING CIRCUIT INCLUDING VIDEO OUTPUT STAGE

[75] Inventor: Toshio Kanai, Osaka, Japan

[73] Assignee: Matsushita Electric Industrial Co., Ltd., Osaka, Japan

[21] Appl. No.: 581,752

[22] Filed: Sep. 13, 1990

[30] Foreign Application Priority Data

Sep. 13, 1989 [JP] Japan .................................. 1-237776

[51] Int. Cl.⁵ .............................................. H04N 5/18
[52] U.S. Cl. ...................................... 358/172; 358/34
[58] Field of Search ................. 358/34, 168, 169, 171, 358/172, 173

[56] References Cited

U.S. PATENT DOCUMENTS

| | | | |
|---|---|---|---|
| 4,598,316 | 7/1986 | Rogers, III | 358/168 |
| 4,599,641 | 7/1986 | Troiano | 358/168 X |
| 4,599,651 | 7/1986 | Rodda | 358/168 X |
| 4,612,576 | 9/1986 | Hinn | 358/171 |
| 4,660,083 | 4/1987 | Allen | 358/172 X |
| 4,716,461 | 12/1987 | Hinn | 358/172 X |
| 4,717,953 | 1/1988 | Chang et al. | 358/172 X |
| 4,722,006 | 1/1988 | Kimura et al. | 358/34 X |

Primary Examiner—James J. Groody
Assistant Examiner—Mark R. Powell
Attorney, Agent, or Firm—Wenderoth, Lind & Ponack

[57] ABSTRACT

A clamping circuit of a high definition CRT display which is adapted to feed the picture signals to the cathode of the cathode-ray tube through a coupling capacitor is connected to the above described cathode, and the above described pulse clamping circuit is operated during the picture blanking period for charging the coupling capacitor so as to change the DC voltage of the cathode. A reference voltage source which conforms to the electrical potential of the black level of the above described picture signal is provided, the above described reference voltage source is connected to the picture signal output line during the picture blanking period so as to reduce the output impedance of the picture output circuit during the same period to correctly reproduce the brightness in spite of the picture signals.

4 Claims, 3 Drawing Sheets input video signal of transistor 1 output video signal of transistor 2 input signal of transistor 10 output signal of transistor 10 voltage of cathode 9

BLACK LEVEL CLAMPING CIRCUIT INCLUDING VIDEO OUTPUT STAGE

BACKGROUND OF THE INVENTION

The present invention generally relates to a black level clamping circuit used in a high definition color CRT display and a high quality television receiver to be used in a computer terminal.

At present, a color CRT adopts in-line electron guns. Since three electron guns of red, blue, green become common except for a cathode electrode, the respective cathode voltages have to be properly selected so as to arrange the level of the beam currents of the three electron guns. If the voltage difference thereof is put together with the voltage difference for changing the difference of the brightness, the variable range of the cathode voltage is required to be 40V through 60V. In the general television receiver, the frequency band of the picture signal is narrow (6 MHz), so that the cathode voltage may be changed by the DC coupling of the picture output circuit to the cathode electrode to change the input bias voltage.

But in the high definition color CRT display, the frequency band of the picture signal is wide (20 to 30 MHz), so that a similar DC insertion circuit cannot be used, but a keyed clamping circuit (or pulse clamping circuit) must be used.

FIG. 1 shows an example of a conventionally used keyed clamping circuit.

Referring now to the drawings, there is shown in FIG. 1, a conventional clamping circuit, which includes a drive transistor 1, with the picture signals being inputted into the base of the drive transistor, an output transistor 2, a by-pass capacitor 3 connected to the output transistor 2, resistors 4 and 5 which divide the power supply voltage Vo to feed the by-pass voltage to the output transistor 2, a load resistor 6, a peaking coil 7, thereby constituting one color of a picture output circuit, and a coupling capacitor 8 for applying picture signals to a CRT cathode 9, a transistor 10 for amplifying the clamping pulses, a transformer 11 for feeding the clamping pulses to the transistor 10, a load resistor 12 of the transistor 10, a diode 13 for applying the output of the transistor 10 to the CRT cathode 9, a variable resistor 14 for varying the output of the transistor 10 so as to constitute a keyed clamping circuit with the transistor 10, the transformer 11, the resistor 12, the diode 13, and the variable resistor 14.

The operation of the clamping circuit made up as described hereinabove will be described with reference to FIGS. 3(a)–3(e) showing the voltage waveforms of each section. When the input picture signal is a step wave signal of a period T as shown in FIG. 3(a), the picture output signal is as shown in FIG. 3(b), wherein VO is a power supply voltage, VB is a block level, and Vw is a white level. The blanking pulse shown in FIG. 3(c) is made in the horizontal output circuit on the normal display at the picture blanking period from a time to to t1. When the pulse is applied to the transformer 11 as the clamping pulse, it is amplified so as to generate the output voltage shown in FIG. 3(d) at the collector of the transistor 10. Since the voltage V1 is lower than the black level VB, the diode 13 becomes conductive at the picture blanking period, the coupling capacitor 8 is charged, so that an electric charge proportional to (VB - V1) is ideally accumulated. After the picture blanking period has been completed, the diode 13 becomes reverse biased, and the coupling capacitor 8 is cut off from the keyed clamping circuit. The voltage of the CRT cathode 9 becomes the voltage shown in FIG. 3(e) due to the remaining electric charge, so that the DC voltage shift is effected. Since the gain of the keyed clamping circuit is almost determined by the ratio in the resistance value of the resistor 12 and the variable resistor 14, the voltage V1 may be optionally changed by the value change in the variable resistor 14, so that the difference in the beam current at the black level among the three electron guns may be removed. As the V1 becomes higher when the input voltage of the transformer 11 is made smaller, the brightness becomes lower so that the brightness may be optionally selected.

When the CRT is made larger in size, the beam current is required to be made large. As the impedance of the CRT cathode becomes lower when the beam current is made large, inconveniences are caused in the conventional black level clamping circuit.

In the circuit of FIG. 1, the impedance of the CRT cathode 9 when the picture signal is the black signal only becomes infinite as the beam current does not flow. The coupling capacitor 8 is not discharged. After some discharging operations, the voltage across the capacitor 8 becomes (VB-V1) as described hereinabove. But as the impedance of the CRT cathode 9 becomes 50KΩ through 100KΩ when the beam current flows at 1 mA in the case of the white signal only, the coupling capacitor 8 is charged more than when the beam current is less, so that the charging operation cannot catch up with the discharging operation. The voltage across the capacitor of becomes too high to be neglected as compared with that of the lower beam current. Namely, there is a problem in that the DC voltage of the signal becomes higher in the cathode 9 and brightness cannot be correctly reproduced.

SUMMARY OF THE INVENTION

Accordingly, the present invention has been developed with a view to substantially eliminating the above discussed drawbacks inherent in the prior art, and has for its essential object to provide an improved black level clamping circuit.

Another important object of the present invention is to provide a clamping circuit, which is adapted to reduce the variations in the DC voltage between the black signal and the white signal so as to correctly reproduce the brightness.

The brightness circuit of the present invention is provided with a means which is adapted to make the output impedance of the picture output circuit smaller for a period of picture blanking pulses only to be fed t the keyed clamping circuit.

In the clamping circuit of the present invention of such construction as described hereinabove, the charging time constant of the coupling capacitor is made much smaller as compared with the discharging time constant to remove the influences of the discharging operation for correctly effecting the DC voltage shift, thus resulting in the correct reproduction of the brightness.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
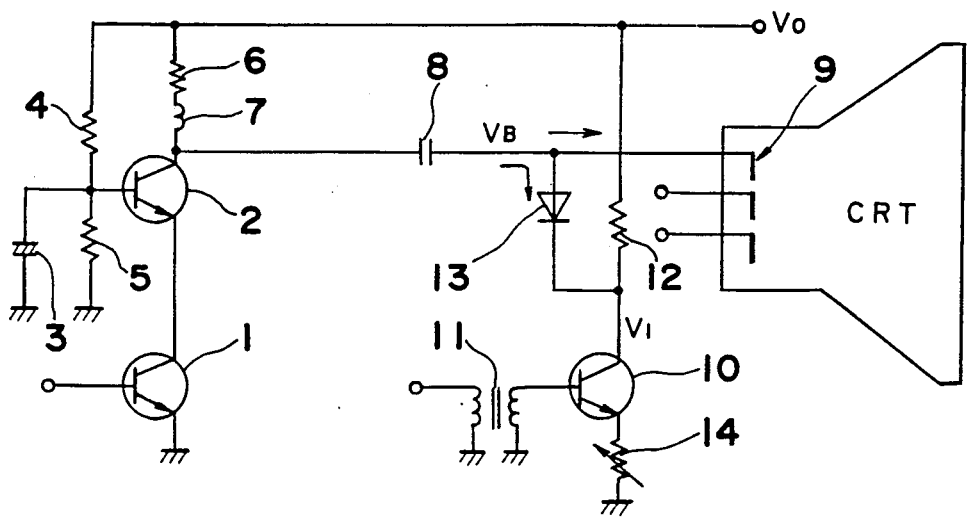
FIG. 1 is a circuit diagram of a conventional clamping circuit.

Before the description of the present invention proceeds, it is to be noted that like parts are designated by like reference numerals throughout the accompanying drawings.

Figure 2:
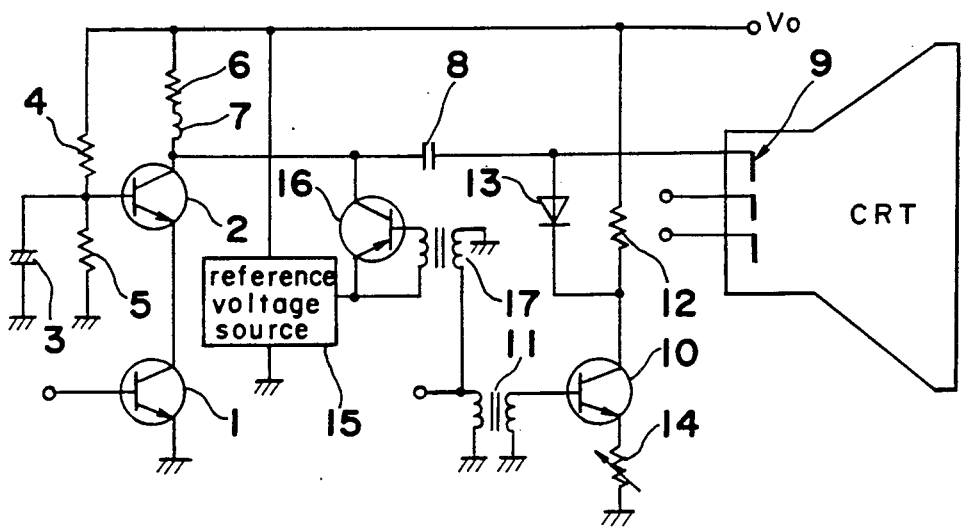
FIG. 2 is a circuit diagram of a clamping circuit in accordance with one embodiment of the present invention.
Figure 3A:
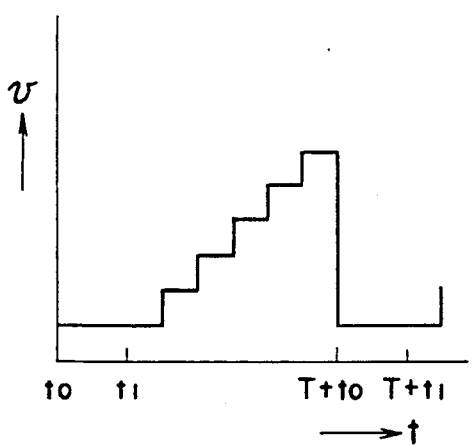
FIGS. 3(a)–3(e) are wave form charts for explaining the operations of the circuits of FIG. 1 and FIG. 2.
Figure 3B:
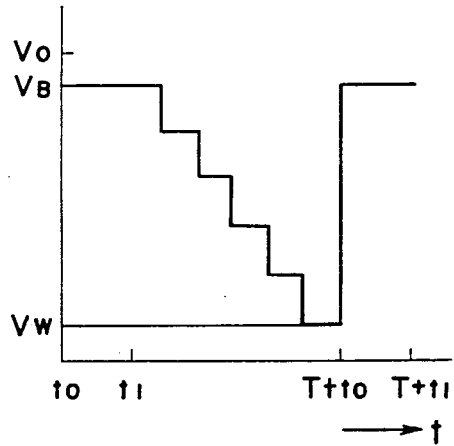
Figure 3C:
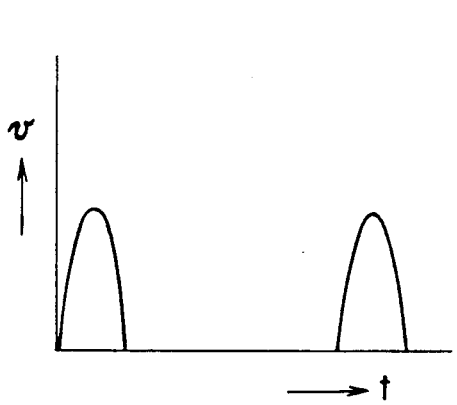
Figure 3D:
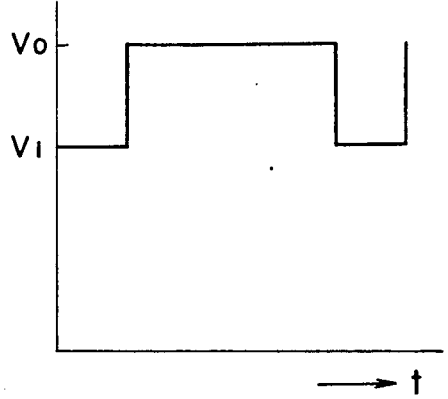
Figure 3E:
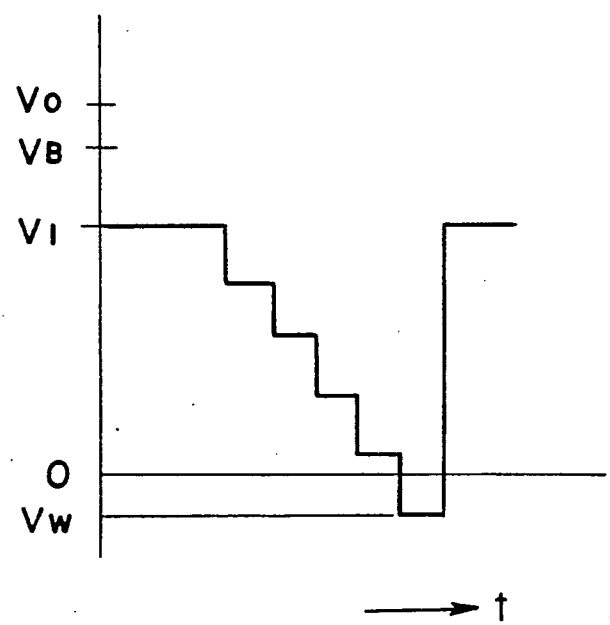

Referring now to FIG. 2, there is shown in FIG. 2, a clamping circuit according to one preferred embodiment of the present invention, which includes a drive transistor 1, an output transistor 2, a by-pass capacitor 3, base bias resistors 4 and 5 of the output transistor 2, a load resistor 6, a peaking coil 7, a coupling capacitor 8, a CRT cathode 9, a transistor 10 for constructing the keyed clamping circuit, a transformer 11, a load resistor 12, a diode 13, a variable resistor 14, which are the same in construction as FIG. 1, a reference voltage source 15, for generating a reference voltage, which is constructed by the resistance division of the power supply voltage Vo, a switching transistor 16, with the collector being connected to the collector of the output transistor 2, and the emitter being connected to the reference voltage source 15, a transformer 17, with the picture blanking pulse as the clamping pulse being applied upon the primary side, the base—emitter of the switching transistor 16 being connected to the secondary side of the transformer 17. Although the transformer 17 and the transformer 11 in the drawing are connected onto the primary side, they may be collected into one transformer. The voltage of the reference voltage source 15 is brought into conformity to the electrical potential of the black level of the picture output signal.

The operation will be described hereinafter.

When the picture blanking pulse for clamping is inputted from the transformer 11, and the keyed clamping circuit is operated as described hereinabove, the same pulse is also applied to the transformer 17, the switching transistor 16 become conductive during the pulse period. Thus, the coupling capacitor 8 is momentarily charged, as it is charged through the transistor 16 from the reference voltage source 15. Even if the coupling capacitor 8 is slightly discharged through the CRT cathode 9 during the period free from pulses (picture signal period), it is momentarily charged during the pulse period of the next period, so that the voltage across the coupling capacitor 8 becomes constant in spite of the picture signal, and the brightness is correctly reproduced with the influences caused by the capacitor discharging being hardly applied.

As the second embodiment, there is a case where the sufficiently small resistance as compared with the load resistance is inserted between the switching transistor 16 and the picture output circuit. Although the object is to minimize as much as possible the distribution capacity to be supplied upon the picture output circuit, the same result as in the first embodiment may be obtained, as there is an effect of making the charging of the coupling capacitor 8 faster even in this case.

As the synchronizing signals are piled up during the picture blanking period in the high quality television, inconveniences are caused when the blanking pulses are used as the clamping pulses. Thus, the so-called front porch pulse, and back porch pulses are formed during a period with no synchronizing signals within the blanking period and are used as the clamping pulse. In this case, the transformers 11 and 17 in the first embodiment are separated from each other, the front porch pulse (or the back porch pulse) is applied to the transformer 11, and the blanking pulse may be added to the transformer 17. The output voltage of the reference voltage source 15 in FIG. 1 is not required to be stationary. If the output of the keyed clamping circuit changes due to ambient temperature changes, the brightness may be made stabler by the controlling of the DC voltage of the CRT cathode through the change in the reference voltage with the output and the temperature thereof as functions.

As is clear from the foregoing description, according to the clamping circuit of the present invention, the correct brightness may be reproduced in spite of the picture signals by the reduction of the impedance at the output terminal of the picture output circuit only for a period of clamping pulses to be fed into the keyed clamping circuit. Furthermore, the brightness change may be prevented by the variation in the temperature and the CRT output with the reference voltage as the function.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A black level clamping circuit for use in a video output stage of a cathode-ray tube (CRT) comprising:
   an output transistor of a video output circuit;
   an coupling capacitor for capacitively coupling a collector of said output transistor to a cathode of the CRT;
   a keyed clamping circuit connected to an output of said coupling capacitor so as to change a DC component of a cathode voltage of said CRT, and
   a reference voltage source having an electrical potential equal to the potential of a black level of an output signal of said output transistor;
   wherein said coupling capacitor is charged by said reference voltage source during at least a clamping period of said keyed clamping circuit.

2. The black level clamping circuit as defined in claim 1, further comprising a switching transistor provided between said reference voltage source and a picture signal output line of said video output circuit, wherein the same pulses applied to said keyed clamping circuit is also applied to a base of said switching transistor so as to make the switching transistor conductive during a pulse period of the keyed clamping circuit.

3. The black level clamping circuit as defined in claim 1, wherein a reference voltage level of said reference voltage source is related to one of an output voltage of said keyed clamping circuit and ambient temperature.

4. A black level clamping circuit for use in a video output stage of a cathode-ray tube (CRT) comprising:
   an output transistor of a video output circuit;

a coupling capacitor for capacitively coupling a collector of said output transistor to a cathode of the CRT;

a reference voltage source having an electrical potential equal to the potential of a black level of an output of signal said output transistor, a switching circuit for applying a voltage of said reference voltage source to said coupling capacitor only for a period of blanking pulses, and a keyed clamping circuit connected to an output of said coupling capacitor so as to charge said coupling capacitor only for a period of one of front-porch pulses and back-porch pulses as well as to change a DC component of a cathode voltage of the CRT.

* * * * *